United States Patent [19]

Grasso

[11] Patent Number: 4,509,548
[45] Date of Patent: Apr. 9, 1985

[54] REACTANT PRESSURE DIFFERENTIAL CONTROL FOR FUEL CELL GASES

[75] Inventor: Albert P. Grasso, Vernon, Conn.

[73] Assignee: The United States of America as represented by the Administrator of the National Aeronautics and Space Administration, Washington, D.C.

[21] Appl. No.: 646,044

[22] Filed: Aug. 31, 1984

Related U.S. Application Data

[63] Continuation of Ser. No. 394,344, Jul. 1, 1982, abandoned.

[51] Int. Cl.³ ............................................. H01M 8/04
[52] U.S. Cl. .................................... 137/99; 137/116.3
[58] Field of Search ................... 137/111, 99, 98, 100, 137/101, 116.3; 429/25

[56] References Cited

U.S. PATENT DOCUMENTS

| | | | |
|---|---|---|---|
| 2,090,843 | 10/1937 | King | 137/98 |
| 2,200,578 | 5/1940 | Mahon | 137/98 |
| 2,870,776 | 1/1959 | Marsh | 137/99 |
| 2,956,577 | 10/1960 | Kirkham | 137/111 |
| 3,087,004 | 4/1963 | Thorsheim | 429/25 |
| 3,106,494 | 10/1963 | Thorsheim | 429/25 |
| 3,217,730 | 11/1965 | Banning, Jr. | 137/111 |
| 3,554,213 | 1/1971 | Yoshino | 137/111 |
| 3,583,422 | 6/1971 | Dach et al. | 137/116.3 |
| 4,226,919 | 10/1980 | Stüwe | 429/25 |

FOREIGN PATENT DOCUMENTS 2023774  1/1980  United Kingdom ............ 137/116.3

Primary Examiner—Martin P. Schwadron
Assistant Examiner—James R. Shay
Attorney, Agent, or Firm—Edward K. Fein; John R. Manning; Marvin F. Matthews

[57] ABSTRACT

A pair of spool valves C and D connected in tandem are balanced between pressures of reactant gases supplied to a fuel cell power plant G to control the pressure differences between the gases so as to maintain those pressures substantially in the proportions necessary for operation of the fuel cell.

4 Claims, 1 Drawing Figure

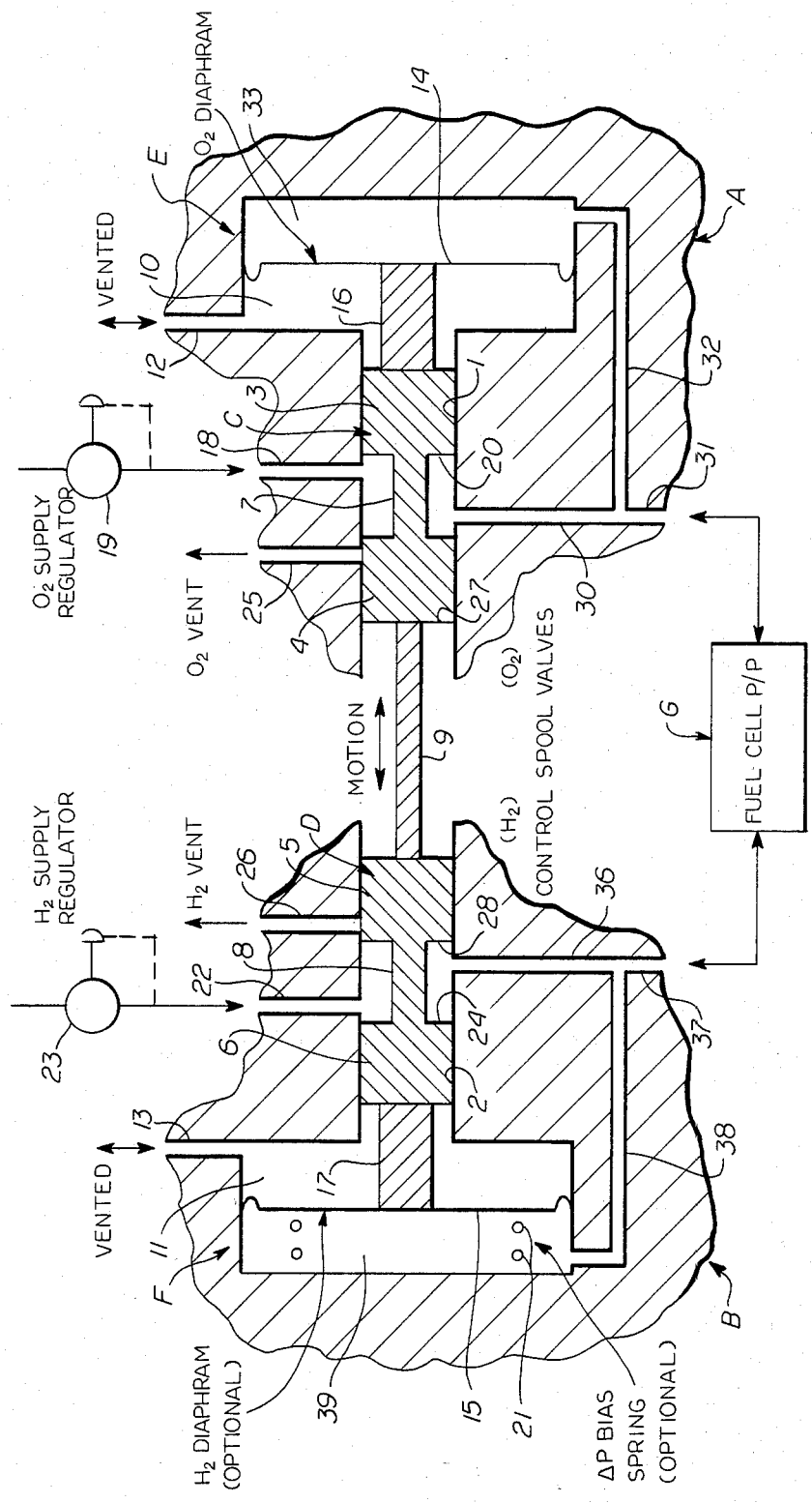

REACTANT PRESSURE DIFFERENTIAL CONTROL FOR FUEL CELL GASES

DESCRIPTION

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435: U.S.C. 2457).

This application is a continuation of application Ser. No. 394,344, filed 7/1/82, now abandoned.

TECHNICAL FIELD

This invention relates to Delta P. control for the fuel and oxidant gases supplied to a Bacon fuel cell power plant. More particularly, the invention consists in a novel tandem spool valve arrangement for maintaining the supply, for instance, of $O_2$ and $H_2$ at proper pressure relationship.

BACKGROUND ART

Multiple spool valve arrangements, frequently complicated and with special or custom components, have been provided for controlling multi-fluid supplies, including fuel and oxidant gases for fuel cells. Examples among U.S. patents are Knapp No. 4,087,967 (control for variable speed, reversible transmissions), Yoshino No. 3,554,213 (synchronization of pressured fluid flows for hydraulic devices), and Bauer No. 696,836 (control of variable speed reversible transmissions).

SUMMARY OF THE PRESENT INVENTION

An object of the present invention is to provide a multiple, integrated valving arrangement especially adapted for controlling the pressure differential of reactant gases of a fuel cell.

Another object is to provide such a valving arrangement for fuel and oxidant supply of relatively simple design and capable of utilizing conventional regulator and spool valve components.

These objects and others hereafter appearing are attained in the herein described device in which a pair of spool valves are axially aligned and connected together to reciprocate in tandem, each controlling one of the reactant gases. At equal or optimum pressures, the valve assembly is centered. However, when the pressures are unequal or errant, the valve assembly is displaced away from the higher pressure end to increase the flow of the lower pressure gas by normal spool valve action. Optional vent ports are provided such that predetermined or major imbalances displace the valve assembly sufficiently to close the higher pressure reactant supply and vent the higher pressure gas to correct the pressure imbalance.

BRIEF DESCRIPTION OF THE DRAWING

The FIGURE is a schematic longitudinal section illustrating the invention.

DETAILED DESCRIPTION OF THE DRAWING

The FIGURE shows, in general, body sections A and B, spools C and D, pressure sensitive devices E and F, and a fuel cell power plant G. The body sections have aligned passages or valve chambers 1 and 2 in which reciprocate spools C and D having, respectively, lands 3 and 4 and 5 and 6 forming therebetween circumferential grooves 7 and 8. The inner ends of the spools are rigidly connected as by a stem or rod 9.

The outer extremities of spool passages 1 and 2 communicate, respectively, with chambers 10 and 11, vented at 12 and 13, between adjacent body sections A and B and diaphragms 14 and 15, respectively, secured at 16 and 17 to spools C and D. Spring 21 bearing against diaphragm 15 is optional. In the centered position of the spool assembly, as shown, $O_2$ supply duct 18 with regulator 19, communicates with spool groove 7 near valving edge 20 on land 3, and $H_2$ supply duct 22 with regulator 23 communicates with spool groove 8 near valving edge 24 on land 6. In the centered position, $O_2$ and $H_2$ vents 25 and 26 are occluded, respectively, by lands 4 and 5 on the spools near the valving edges 27 and 28 thereof.

$O_2$ supply normally exits from groove 7 in spool C through a duct 30 having branches 31 and 32 leading, respectively, to power cell power plant G and a chamber 33 for application to pressure sensitive diaphragm 14. $H_2$ exists from spool groove 8 through a duct 36 with branches 37 and 38 connecting, respectively, with the fuel cell and a chamber 39 for exposure to pressure sensitive diaphragm 15.

OPERATION

In operation, with $O_2$ and $H_2$ connected, respectively, to the spool assembly and chambers 33 and 39, relative pressures applied to diaphragms 14 and 15 will center the spool assembly if the pressures are equal or otherwise in proper relationship. Should the reactant gas pressures become unbalanced, the spools are pushed away from the higher pressured chamber 33 or 39. If the spool displacement is sufficient, valving edge 20 or 24 will restrict supply duct 18 or 22 reducing the pressure in chamber 33 or 39 causing re-centering of the spool assembly. In case of major increases of pressure in chamber 33 or 39, the $O_2$ or $H_2$ supply duct may be completely shut off and vent duct 25 or 26 opened. The reactant supply ducts and vents are positioned relative to the spools to cause reciprocal adjustment of the gas supplies, as needed.

Certain modifications may be made, for instance, other pressure sensitive devices may be substituted for diaphragms 14 and/or 15, or such devices eliminated, whereupon pressures in chambers 33 and 39 will directly contact the spools with resultant loss of sensitivity. Other types of valves could be substituted for the spools C and D. Also, diaphragm spring 21 may be omitted to eliminate the small pressure differential caused thereby.

Thus, the use of the invention enables the use of standard regulators, valves, and pressure sensitive devices replacing the customized elements now frequently in use. The exclusive use of all modifications as come within the scope of the appended claims is contemplated.

I claim:

1. Means to control, vent and balance the supply of two separate reactant gases to a fuel cell comprising a control valve for each of said gases, separate flow path means for each of said gases for preventing intermingling of said gases, devices responsive to the pressures of the respective gases for actuating said valves, said valves being rigidly connected together so as to operate in unison for reciprocal adjustment of said gases, and dual vent means, one for each gas, operably associated with said valves for automatically accommodating major pressure unbalances between said gases.

2. Control means as described in claim 1 in which said valves are spool valves slidable in valve chamber-passages.

3. Control means as described in claim 1 in which said pressure sensitive devices are diaphragms located at and linked to opposite ends of said spools.

4. Control means for fuel cell reactant gases comprising a pair of aligned valve chambers, separate flow path means for each of said gases for preventing intermingling of said gases, a pair of spool valves slidable in respective ones of said chambers and linked together intermediately, pressure chambers communicating respectively with opposite ends of said valve chambers, a movable wall pressure sensitive device in each of said pressure chambers and each linked to one of said spool valves, fuel cell reactant supply ducts each communicating with one of said valve chambers upstream of the fuel cell and positioned relative to the corresponding spool valve to cause correction of a controlled gas supply at improper pressure, and vent means in each of said spool valves responsive to major increases is pressure for venting each of said gases.

* * * * *